US010651922B2

(12) United States Patent
Miyakawa et al.

(10) Patent No.: US 10,651,922 B2
(45) Date of Patent: May 12, 2020

(54) THREE-DIMENSIONALIZATION OF FIFTH GENERATION COMMUNICATION

(71) Applicant: SoftBank Corp., Tokyo (JP)

(72) Inventors: Junichi Miyakawa, Tokyo (JP); Kiyoshi Kimura, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/491,345

(22) PCT Filed: Mar. 17, 2018

(86) PCT No.: PCT/JP2018/010663
§ 371 (c)(1),
(2) Date: Sep. 5, 2019

(87) PCT Pub. No.: WO2018/173983
PCT Pub. Date: Sep. 27, 2018

(65) Prior Publication Data
US 2020/0028570 A1 Jan. 23, 2020

(30) Foreign Application Priority Data

Mar. 21, 2017 (JP) .................. 2017-054957

(51) Int. Cl.
*H04B 7/185* (2006.01)
*H04W 84/04* (2009.01)

(52) U.S. Cl.
CPC ....... *H04B 7/18504* (2013.01); *H04W 84/042* (2013.01)

(58) Field of Classification Search
CPC ...... H04B 7/18504; H04B 7/185; H04B 7/06; H04W 84/042; H04W 84/06;
(Continued)

(56) References Cited

U.S. PATENT DOCUMENTS

2010/0026603 A1  2/2010  McSpadden
2010/0157826 A1  6/2010  Yu et al.
(Continued)

FOREIGN PATENT DOCUMENTS

JP  62-011484 A  1/1987
JP  10-066138 A  3/1998
(Continued)

OTHER PUBLICATIONS

Lte Advanced, ARIB, 3$^{rd}$ Generation Partnership Project, Technical Specification Group Radio Access Network, "Evolved Universal Terrestrial Radio Access (E-UTRA) and Evolved Universal Terrestrial Radio Access Network (E-UTRAN)," Overall description; Stage 2, ARIB Std-T104-36.300 V10.12.0, Release 10, Dec. 2014.
(Continued)

*Primary Examiner* — Ian N Moore
*Assistant Examiner* — Brian T Le
(74) *Attorney, Agent, or Firm* — Muirhead and Saturnelli, LLC

(57) ABSTRACT

A communication system capable of realizing a three-dimensional network of the fifth generation mobile communication with low propagation delay in a radio communication is provided. The communication system comprises a radio relay station that relays a radio communication with the terminal apparatus. The radio relay station is provided in a floating object that is controlled so as to be located in a floating airspace with an altitude of 100 [km] or less by an autonomous control or an external control. When the floating object is located in the floating airspace, the radio relay station forms a three-dimensional cell in a predetermined cell-formation target airspace between the floating object and a ground level or a sea level.

27 Claims, 12 Drawing Sheets

(58) Field of Classification Search
CPC ... H04W 84/047; H04W 16/26; H04W 16/28; H04W 16/24
See application file for complete search history.

(56) References Cited

U.S. PATENT DOCUMENTS

| | | |
|---|---|---|
| 2012/0048990 A1 | 3/2012 | Sommer |
| 2012/0326660 A1 | 12/2012 | Lu et al. |
| 2013/0112158 A1 | 5/2013 | Weinzierl et al. |
| 2016/0046387 A1 | 2/2016 | Frolov et al. |
| 2016/0050011 A1 | 2/2016 | Frolov et al. |
| 2016/0050012 A1 | 2/2016 | Frolov et al. |
| 2016/0119052 A1 | 4/2016 | Frerking et al. |
| 2016/0156406 A1 | 6/2016 | Frolov et al. |
| 2016/0223079 A1 | 8/2016 | Takahashi et al. |
| 2017/0064037 A1 | 3/2017 | Das et al. |
| 2019/0107399 A1 | 4/2019 | Takashi et al. |

FOREIGN PATENT DOCUMENTS

| | | |
|---|---|---|
| JP | 2004-187242 A | 7/2004 |
| JP | 2012-513155 A1 | 6/2012 |
| JP | 2016-58929 A | 4/2016 |
| WO | WO 2016/028767 A1 | 2/2016 |
| WO | WO 2017/039806 A1 | 3/2017 |

OTHER PUBLICATIONS

Lte Advanced Pro, 3$^{rd}$ Generation Partnership Project, Technical Specification Group Radio Access Network, "Evolved Universal Terrestrial Radio Access (E-UTRA) and Evolved Universal Terrestrial Radio Access Network (E-UTRAN)," Overall description; Stage 2, 3GPP TS 36.300 V13.5.0, Release 13, Sep. 2016.

Giovanni Romano, "3GPP RAN progress on "5G"," 3GPP, TIM, 2016.

Ericsson, "Motivation for Study on Enhanced LTE Support for Aerial Vehicles," 3GPP TSG RAN #74 RP-162039, Dec. 5-8, 2016, pp. 2-4.

THREE-DIMENSIONALIZATION OF FIFTH GENERATION COMMUNICATION

TECHNICAL FIELD

The present invention relates to a three-dimensionalization of the fifth generation communication.

BACKGROUND ART

There is conventionally known of a communication standard called the LTE-Advanced Pro (refer to Non-Patent Literature 2), which has been developed from the LTE (Long Term Evolution)-Advanced (refer to Non-Patent Literature 1) of the 3GPP that is a communication standard of a mobile communication system. In this LTE-Advanced Pro, specifications for providing communications to devices for the IoT (Internet of Things) in recent years have been formulated. Furthermore, the fifth-generation mobile communication coping with a simultaneous connection to a large number of terminal apparatuses (also called as "UE (user equipment)", "mobile station", "communication terminal") such as devices for the IoT, a reduction of delay time, etc. is being studied (for example, refer to Non-Patent Literature 3).

CITATION LIST

Non-Patent Literature

Non-Patent Literature 1: 3GPP TS 36.300 V10.12.0 (2014-12).
Non-Patent Literature 2: 3GPP TS 36.300 V13.5.0 (2016-09).
Non-Patent Literature 3: G Romano, "3GPP RAN progress on "5G"", 3GPP, 2016.

SUMMARY OF INVENTION

Technical Problem

In the foregoing mobile communications of the fifth generation or the like, there is a problem that it is desired to realize a three-dimensionalized network, in which a propagation delay is low, a simultaneous connection with a large number of terminals in a wide-range area and a high-speed communication can be performed, and a system capacity per unit area is large, in radio communications with terminal apparatuses including devices for the IoT.

Solution to Problem

A communication system according to an aspect of the present invention is a communication system comprising a radio relay station that relays a radio communication with a terminal apparatus. The radio relay station is provided in a floating object that is controlled to be located in a floating airspace less than or equal to 100 [km] from a ground level or a sea level by an autonomous control or an external control. When the floating object is located in the floating airspace, the radio relay station forms a three-dimensional cell in a predetermined cell-formation target airspace between the floating object and the ground level or the sea level.

A floating object according to another aspect of the present invention is a floating object comprising a radio relay station that relays a radio communication with a terminal apparatus. The floating object is controlled to be located in a floating airspace with altitude less than or equal to 100 [km] by an autonomous control or an external control. When the floating object is located in the floating airspace, the radio relay station forms a three-dimensional cell in a predetermined cell-formation target airspace between the floating object and a ground level or a sea level.

In the foregoing communication system, the communication system may comprise a plurality of radio relay stations provided in the floating object, each of the plurality of radio relay stations may form a beam for performing a radio communication with the terminal apparatus toward the ground level or the sea level, and the plurality of beams adjacent to each other in the cell-formation target airspace may be partially overlapped with each other.

In the foregoing communication system and the foregoing floating object, the plurality of beams may be formed so as to cover an overall upper end surface of the cell-formation target airspace.

In the foregoing communication system and the foregoing floating object, each of the plurality of beams may be formed in a conical shape, and when a divergence angle of the beam is defined as θ [rad], altitude of the radio relay station of the floating object is defined as Hrs [m], a horizontal interval of the plurality of radio relay stations is defined as Drs [m], and altitude of the upper end of the cell-formation target airspace is defined as Hcu [m], a following expression (1) may be satisfied.

$$2\times(Hrs-Hcu)\times\tan\theta \geq Drs \quad (1)$$

In the foregoing communication system and the foregoing floating object, when altitude of a lower end of the cell-formation target airspace is defined as Hcl [m] and a maximum reachable distance of the radio signal between the radio relay station of the floating object and the terminal apparatus is defined as Lmax [m], a following expression (2) may be satisfied.

$$(Hrs-Hcl)/\cos\theta \leq L\max \quad (2)$$

In the foregoing communication system, the system may comprises a radio relay station on a ground or a sea for forming a beam for a radio communication with the terminal apparatus toward the cell-formation target airspace. This radio relay station on the ground or on the sea may form a beam in a portion of the cell-formation target airspace in which the beam formed by the radio relay station of the floating object does not pass.

In the foregoing communication system, the system may comprise a feeder station on a ground or on a sea for performing a radio communication with the radio relay station of the floating object directly or via an artificial satellite.

In the foregoing communication system, the system may comprise a remote control apparatus that remotely controls at least one of the floating object and the radio relay station.

In the foregoing communication system and the foregoing floating object, the floating object including the radio relay station may be positionally controlled so that the altitude of the three-dimensional cell in the cell-formation target airspace relative to the ground level is maintained at a predetermined altitude, based on the elevation of the ground level located below the floating object.

In the foregoing communication system, the system may comprise a remote control apparatus for controlling the position of the radio relay station provided in the floating object, and the direction and the divergence angle of the beam formed by the radio relay station.

In the foregoing communication system and floating object, the altitude of the cell-formation target airspace may be less than or equal to 10 [km]. The altitude of the cell-formation target airspace may be 50 [m] or more and 1 [km] or less.

In the foregoing communication system and the foregoing floating object, the floating object including the radio relay station may be located in a stratosphere with the altitude of 11 [km] or more and 50 [km] or less.

In the foregoing communication system and the foregoing floating object, the radio relay station may be a base station or a repeater of a mobile communication network.

In the foregoing communication system and the foregoing floating object, the radio relay station may include an edge computing section.

In the foregoing communication system and the foregoing floating object, the floating object may comprise a battery that supplies an electric power to the radio relay station or may comprise a photovoltaic power generation apparatus that generates an electric power to be supplied to the radio relay station.

In the foregoing communication system and the foregoing floating object, the floating object may be a solar plane including a wing with a photovoltaic power generation panel for generating an electric power to be supplied to the radio relay station and a rotatably drivable propeller installed on the wing, or an airship including a battery that supplies an electric power to the radio relay station.

Advantageous Effects of Invention

According to the present invention, it is possible to realize a three-dimensional network of the fifth generation mobile communication with low propagation delay in radio communication.

DESCRIPTION OF EMBODIMENTS

Hereinafter, embodiments of the present invention will be described with reference to the drawings.

Figure 1:
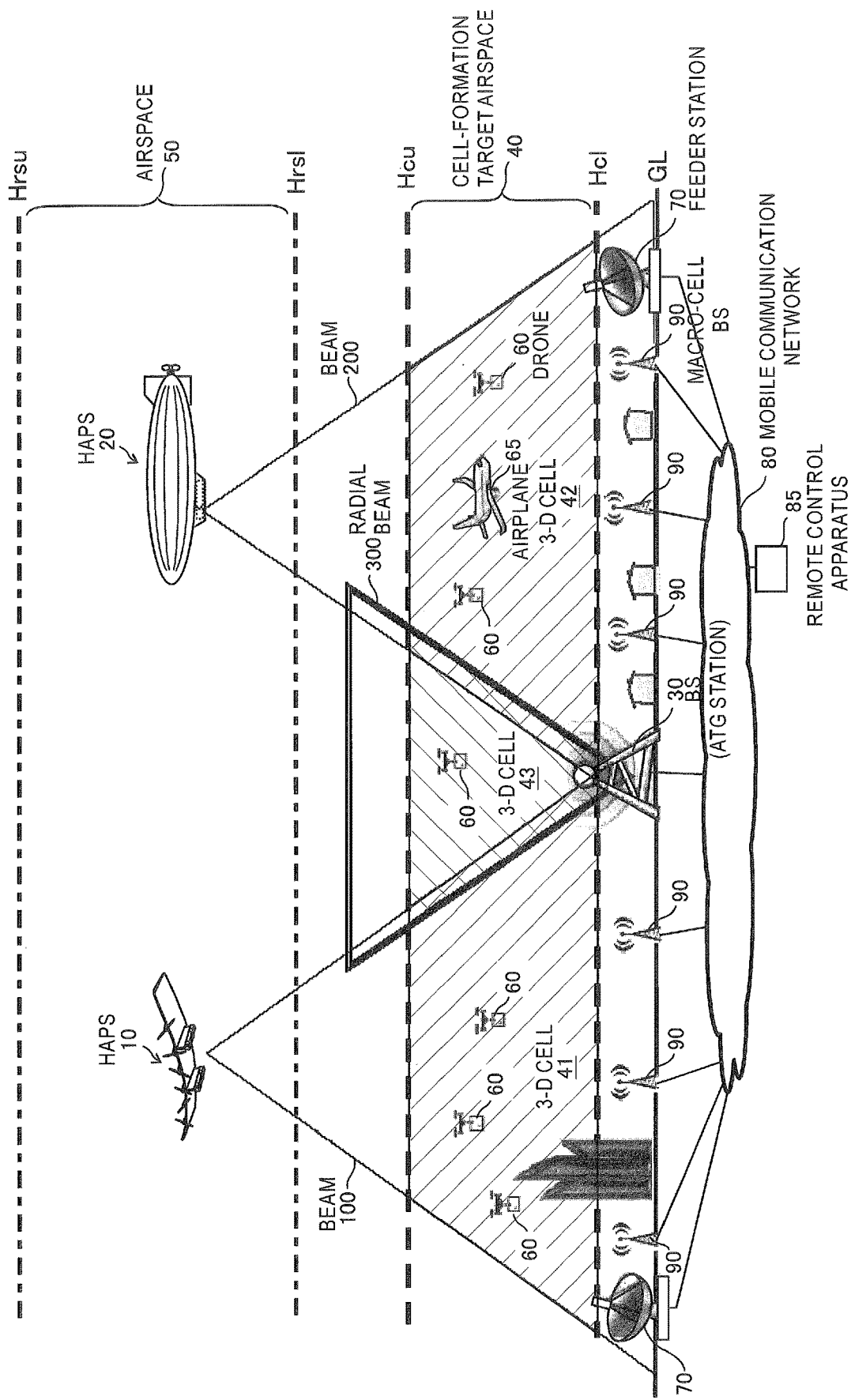
FIG. 1 is a schematic configuration diagram showing an example of an overall configuration of a communication system for realizing a three-dimensional network according to an embodiment of the present invention.

FIG. 1 is a schematic configuration diagram showing an example of an overall configuration of a communication system according to an embodiment of the present invention. The communication system according to the present embodiment is suitable for realizing a three-dimensional network of the fifth generation mobile communication corresponding to a simultaneous connection to a large number of terminal apparatus (also referred to as "mobile station", "mobile device" or "user equipment (UE)"), low delay method, etc. It is noted that, the mobile communication standard applicable to a communication system, a radio relay station, a base station, a repeater, and a terminal apparatus disclosed in this description, includes a fifth generation mobile communication standard and next generation mobile communication standards after the fifth generation.

As shown in FIG. 1, a communication system is provided with a plurality of High Altitude Platform Stations (HAPS) (also referred to as "High Altitude Pseudo Satellite") 10 and 20, and forms three-dimensional cells (three-dimensional areas) 41 and 42 as indicated by hatching areas in the figure in a cell-formation target airspace 40 at a predetermined altitude. Each of the HAPSs 10 and 20 is a floating object (for example, solar plane, airship) including a radio relay station mounted therein, which is controlled to be floated and located in a floating airspace (hereinafter also simply referred to as "airspace") 50 with high altitude of 100 [km] or less from the ground level or the sea level by an autonomous control or an external control.

The airspace 50 in which the HAPSs 10 and 20 are located is, for example, a stratospheric airspace with altitude greater than 11 [km] and less than 50 [km]. The airspace 50 in which the HAPSs 10 and 20 are located may be an airspace in the altitude range of 15 [km] or more and 25 [km] or less where weather conditions are relatively stable, and may be an airspace with altitude of about 20 [km] in particular. Each of Hrs1 and Hrsu in the figure indicates relative altitudes of the lower end and the upper end of the airspace 50 with reference to the ground level (GL), in which the HAPSs 10 and 20 are located.

The cell-formation target airspace 40 is a target airspace for forming a three-dimensional cell with one or more HAPSs according to the communication system of the present embodiment. The cell-formation target airspace 40 is an airspace in a predetermined altitude range (for example, altitude range of 50 [m] or more and 1000 [m] or less) located between the airspace 50 where the HAPSs 10 and 20 are located and a cell-formation area near the ground level covered by a base station 90 such as a conventional macro-cell base station. Each of Hcl and Hcu in the figure indicates relative altitudes of the lower end and the upper end of the cell-formation target airspace 40 with reference to the ground level (GL).

It is noted that, the cell-formation target airspace 40 where the three-dimensional cell of the present embodiment is formed may be an airspace over the sea, a river or a lake.

The radio relay stations of the HAPSs 10 and 20 respectively forms beams 100 and 200 for a radio communication with the terminal apparatus that is a mobile station, toward the ground level. The terminal apparatus may be a communication terminal module incorporated in a drone 60 that is a small helicopter capable of remotely steering, or may be a user terminal apparatus used by a user in the airplane 65. The areas through which the beams 100 and 200 pass in the cell-formation target airspace 40 are three-dimensional cells 41 and 42. The plurality of beams 100 and 200 adjacent to each other in the cell-formation target airspace 40 may be partially overlapped with each other.

Each of the radio relay stations of the HAPSs 10 and 20 is connected to a core network of a mobile communication network 80 via a feeder station 70 that is a relay station installed on the ground or on the sea.

Each of the HAPSs 10 and 20 may autonomously control its own floating movement (flight) or a processing at the radio relay station, by executing a control program with a control section including a computer or the like incorporated in the inside of the HAPS. For example, each of the HAPSs 10 and 20 may acquire its own current position information (for example, GPS position information), position control information (for example, flight schedule information) stored in advance, and position information on another HAPS located in a peripheral space, etc., and autonomously control the floating movement (flight) and the processing in the radio relay station based on these information.

The floating movement (flight) of each HAPS 10 and 20 and the processing in the radio relay stations may be controlled by a remote control apparatus 85 of a communication operator, which is disposed in a communication center or the like of the mobile communication network 80. In this case, the HAPSs 10 and 20 may include a terminal communication apparatus (for example, a mobile communication module) so that control information from the remote control apparatus 85 can be received, and terminal identification information (for example, IP address, telephone number, etc.) may be allocated to the terminal communication apparatus so as to be identified from the remote control apparatus 85. Each of the HAPSs 10 and 20 may transmit information relating to the floating movement (flight) of the HAPS itself or the surrounding HAPS and the processing at the radio relay station to a predetermined destination such as the remote control apparatus 85.

In the cell-formation target airspace 40, there is a possibility that a spatial area where the beams 100 and 200 of the HAPSs 10 and 20 do not pass may occur, in which the three-dimensional cells 41 and 42 are not formed. In order to spatially complement this area, as shown in the configuration example in FIG. 1, a base station (hereinafter referred to as "ATG station") 30 may be disposed, which forms a three-dimensional cell 43 by forming a radial beam 300 from the ground or the sea side upward to make an ATG (Air To Ground) connection.

By adjusting the positions of the HAPSs 10 and 20 and the divergence angle (beam width) etc. of the beams 100 and 200 without using the ATG station, the radio relay stations of the HAPSs 10 and 20 may form the beams 100 and 200 covering the overall upper end face of the cell-formation target space region 40 so that three-dimensional cells are formed all over the cell-formation target space 40.

Figure 2:
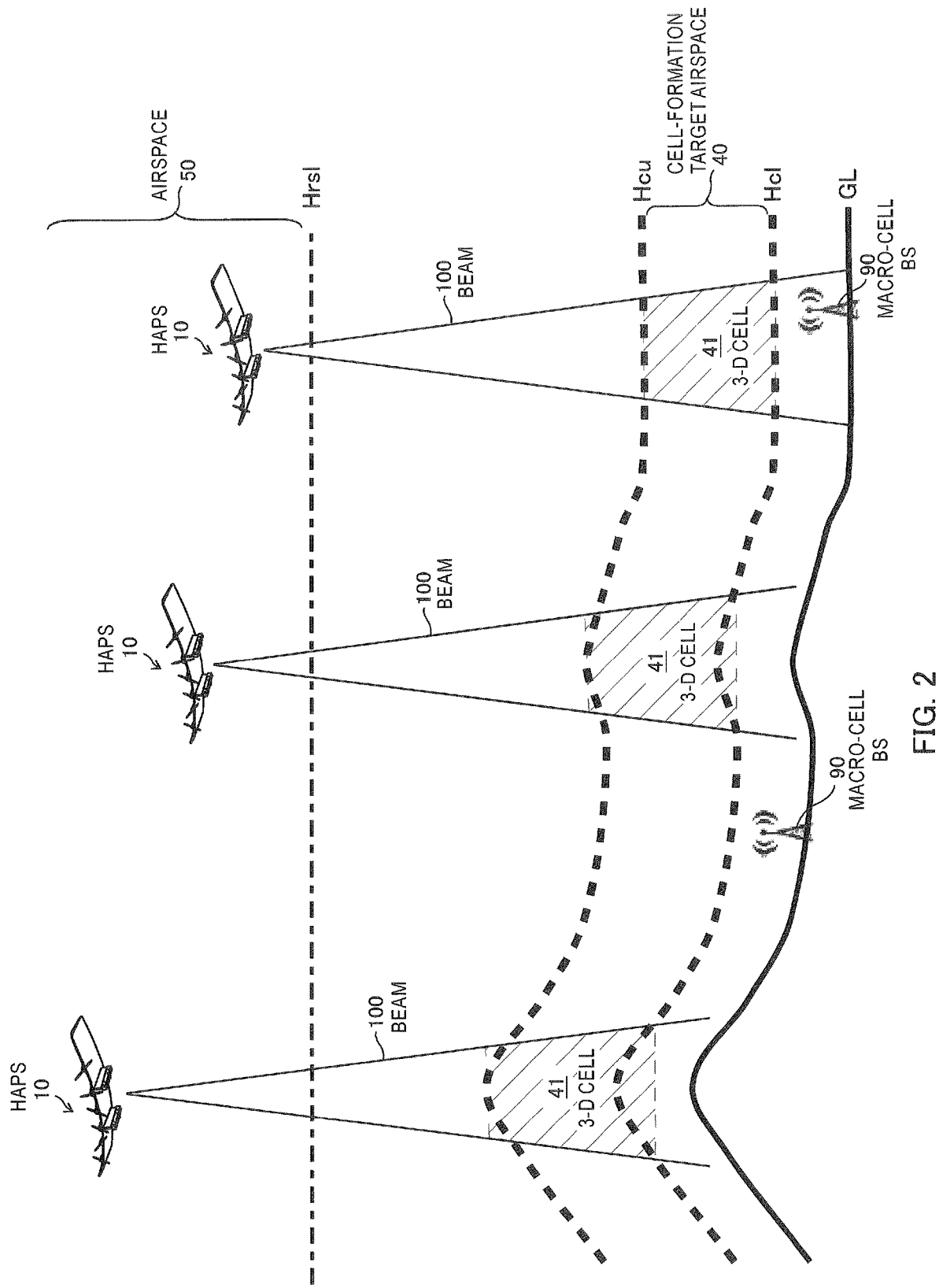
FIG. 2 is a schematic configuration diagram showing an example of an overall configuration of a communication system for realizing a three-dimensional network according to another embodiment.

FIG. 2 is a schematic configuration diagram showing an example of an overall configuration of a communication system that realizes a three-dimensional network according to another embodiment. The example in FIG. 2 is an example in case that a location where a three-dimensional network is formed is an inland area or a mountainous area where an elevation changes due to the undulation of the ground level (GL). In this case, regardless of the elevation of the ground level, the altitude of the HAPS 10 is controlled based on the elevation (topographic data) of the ground level located below the HAPS so that the relative altitude of the cell-formation target airspace 40 from the ground level (GL) is maintained constant. For example, the altitude of the HAPS 10 is controlled to be located at the altitude of 20 [km] above a plain area with low elevation, and the altitude of the HAPS 10 is controlled to be located at the altitude of 23 [km] above a mountainous area with higher elevation than the plain area by about 3000 [m]. Accordingly, it is possible to form a three-dimensional cell 41 having substantially the same size and constant height from the ground above both of the plain area and the mountainous area, and the size of the spot of the beam 100 on the upper end face of the cell-formation target space region 40 can also be kept constant. Instead of or in addition to the altitude control of the HAPS 10, the HAPS 10 may perform a fine adjustment (tracking) the divergence angle (beam width) and beam direction of the beam 100 so as to form a three-dimensional cell 41 with substantially the same size according to the undulation of the ground level below the HAPS.

Figure 3:
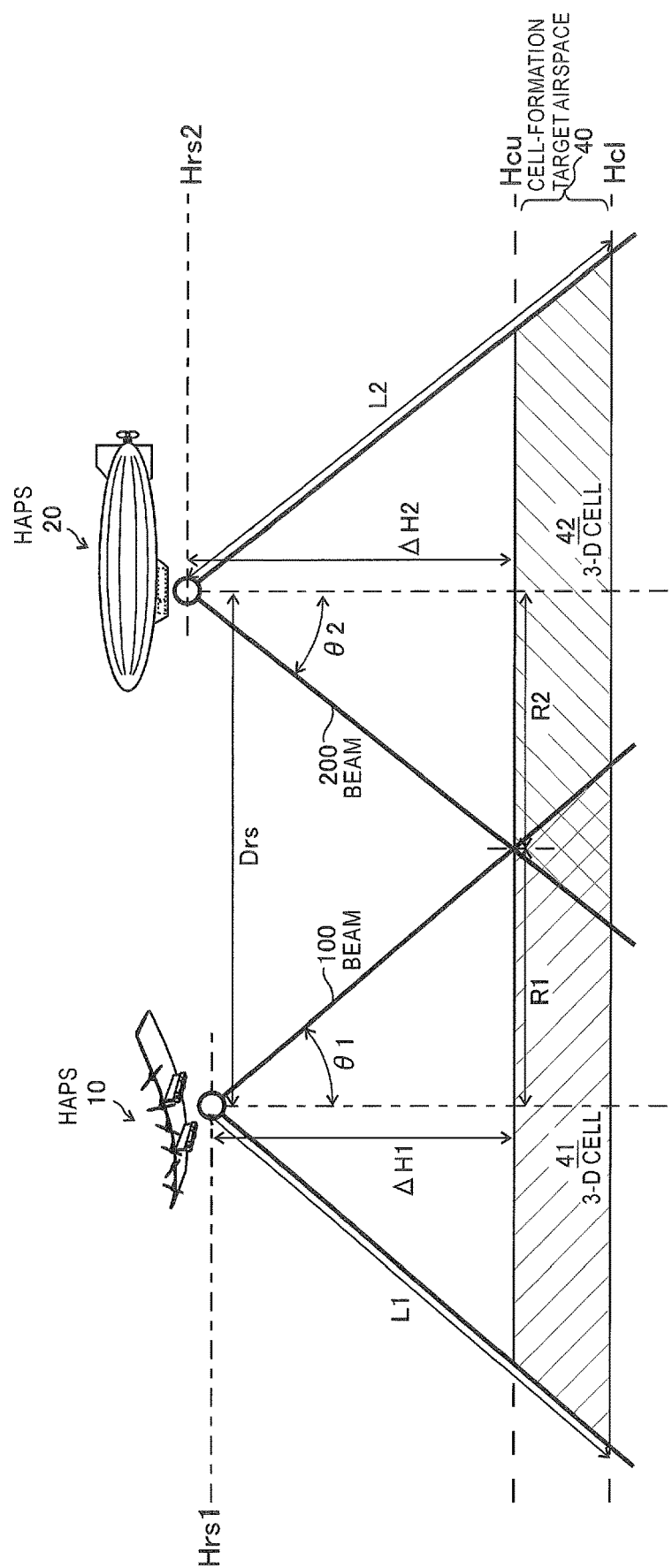
FIG. 3 is an illustration showing the positions of HAPSs and a relationship between beams respectively formed by the HAPSs and a three-dimensional cell for realizing the three-dimensional network in the embodiment.

FIG. 3 is an illustration showing the positions of the HAPSs 10 and 20, and a relationship between the beams 100 and 200 respectively formed by the HAPS 10 and 20 and the three-dimensional cells 41 and 42 for realizing the three-dimensional network in the embodiment. The formation of the three-dimensional cells 41 and 42 by the HAPSs 10 and 20 is controlled, for example, as follows.

When the altitude of the HAPS 10 (radio relay station) is defined as Hrs1 [m] and the altitude of the upper end of the cell-formation target airspace 40 is defined as Hcu [m], the altitude difference between the HAPS 10 and the upper end of the cell-formation target airspace 40 is ΔH1=Hrs1−Hcu [m]. When the divergence angle of the conical beam 100 formed downward in the vertical direction from the HAPS 10 is defined as θ1 [rad], the radius R1 [m] of the beam 100 at the upper end of the cell-formation target airspace 40 is expressed by a following expression (3).

$$R1 = \Delta H1 \times \tan(\theta 1) = (Hrs1 - Hcu) \times \tan(\theta 1) \qquad (3)$$

When the altitude of the HAPS 20 (radio relay station) is defined as Hrs2 [m], the altitude difference between the HAPS 20 and the upper end of the cell-formation target airspace 40 is ΔH2=Hrs2−Hcu [m]. When the divergence angle of the conical beam 200 formed downward in the vertical direction from the HAPS 20 is defined as θ2 [rad], the radius R2 [m] of the beam 200 at the upper end of the cell-formation target airspace 40 is expressed by a following expression (4).

$$R2 = \Delta H2 \times \tan(\theta 2) = (Hrs2 - Hcu) \times \tan(\theta 2) \qquad (4)$$

When the horizontal interval between the HAPS 10 (radio relay station) and the HAPS 20 (radio relay station) is defined as Drs [m], the conditional expression for covering the overall upper end surface of the cell-formation target space region 40 by the beams 100 and 200 of the HAPSs 10 and 20 is as shown in a following expression (5).

$$R1+R2=(Hrs1-Hcu)\times\tan(\theta 1)+(Hrs2-Hcu)\times\tan(\theta 2)$$
$$\geq Drs \quad (5)$$

Herein, assuming that the altitude Hrs1 of the HAPS 10 and the altitude Hrs2 of the HAPS 20 are the same altitude (Hrs), and the divergence angles $\theta 1$ and $\theta 2$ of each beam are the same angle ($\theta$), the conditional expression for covering the overall upper end surface of the cell-formation target space area 40 by the beams 100 and 200 of the HAPSs 10 and 20 is as shown in a following expression (6).

$$R1+R2=2\times(Hrs-Hcu)\times\tan\theta \geq Drs \quad (6)$$

By adjusting and controlling at least one of the altitude of each HAPS 10 and 20, the divergence angle (beam width) of the beams 100 and 200 and the horizontal interval Drs of the HAPSs 10 and 20 so as to satisfy the above expression (5) or expression (6), it is possible to cover the overall upper end surface of the cell-formation target space area 40 by the beams 100 and 200 of the HAPSs 10 and 20.

It is noted that, when the directions of the center lines of the beams 100 and 200 of the HAPSs 10 and 20 are inclined from the vertical direction, the conditional expressions (5) and (6) may be derived and set in consideration of the angle of the inclination.

The maximum reachable distance in which radio signals (radio waves) can be received with a predetermined intensity between the radio relay stations of HAPSs 10 and 20 and the terminal apparatus is finite (for example, 100 [km]). When the maximum reachable distance is defined as Lmax [m] and the altitude of the lower end of the cell-formation target airspace 40 is defined as Hcl [m], the conditional expressions by which each of the HAPSs 10 and 20 and the terminal apparatus located at the lower end of the cell-formation target airspace 40 can communicate with each other are expressed by following expressions (7) and (8).

$$(Hrs1-Hcl)/\cos(\theta 1) \leq L\max \quad (7)$$

$$(Hrs2-Hcl)/\cos(\theta 2) \leq L\max \quad (8)$$

Herein, assuming that the altitude Hrs1 of the HAPS 10 and the altitude Hrs2 of the HAPS 20 are the same altitude (Hrs), and the divergence angles $\theta 1$ and $\theta 2$ of each beam are the same angle ($\theta$), the conditional expression by which each of the HAPSs 10 and 20 and the terminal apparatus located at the lower end of the cell-formation target airspace 40 can communicate with each other is as shown in a following expression (9).

$$(Hrs-Hcl)/\cos\theta \leq L\max \quad (9)$$

By adjusting and controlling at least one of the altitude of each of the HAPSs 10 and 20 and the divergence angle (beam width) of the beams 100 and 200 so as to satisfy the above expressions (7), (8) or (9), it is possible to reliably communicate between each of the HAPSs 10 and 20 and the terminal apparatus located at the lower end of the cell-formation target airspace 40.

It is noted that, the three-dimensional cell formed by the HAPSs 10 and 20 may be formed so as to reach the ground level or the sea level so as to be able to communicate also with the terminal apparatus located on the ground or on the sea.

Figure 4:
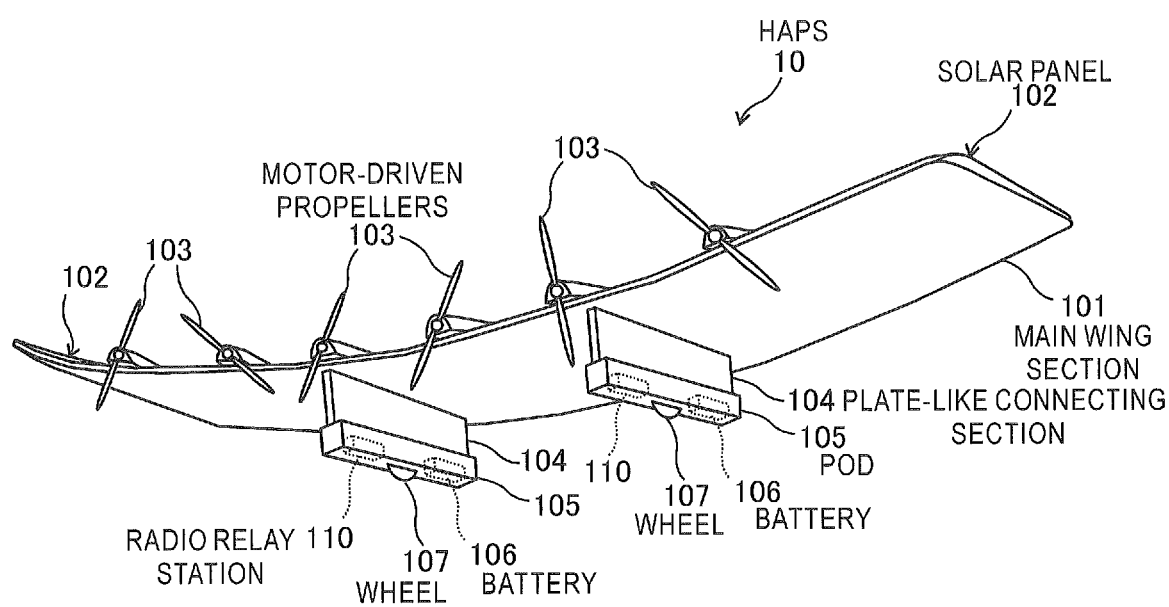
FIG. 4 is a perspective view showing an example of HAPS used in a communication system in the embodiment.

FIG. 4 is a perspective view showing an example of the HAPS 10 used in the communication system in the embodiment. The HAPS 10 in FIG. 4 is a solar plane type HAPS. The HAPS 10 has a main wing section 101 in which a solar panel 102 as a photovoltaic power generation section having a photovoltaic power generation function is provided on the upper surface and both end portions in the longitudinal direction are warped upward, and a plurality of motor-driven propellers 103 as a propulsion apparatus of a bus-motive power system provided at one end edge portion of the main wing section 101 in the lateral direction. Pods 105 as a plurality of apparatus accommodating sections for accommodating the mission equipment are connected to the two positions in the longitudinal direction of the lower surface of the main wing section 101 via a plate-like connecting section 104. Inside each pod 105, a radio relay station 110 as a mission equipment and a battery 106 are accommodated. On the lower surface side of each pod 105, wheels 107 used on departure and arrival are provided. The electric power generated by the solar panel 102 is stored in the battery 106, the motor of the propeller 103 is rotationally driven by the electric power supplied from the battery 106, and the radio relay processing by the radio relay station 110 is executed.

The solar plane type HAPS 10 can float with lift force by, for example, performing a turning flight or performing a flight along a figure of "8", and can float to stay in a predetermined range in the horizontal direction at a predetermined altitude. It is noted that, the solar plane type HAPS 10 can also fly like a glider when the propeller 103 is not rotationally driven. For example, when electric power of the battery 106 is surplus by power generation of the solar panel 102, such as in daytime, the solar plane type HAPS 10 rises up to a high position. And when an electric power cannot be generated by the solar panel 102 such as at night, the solar plane type HAPS 10 can stop power supply from the battery 106 to the motor and can fly like a glider.

Figure 5:
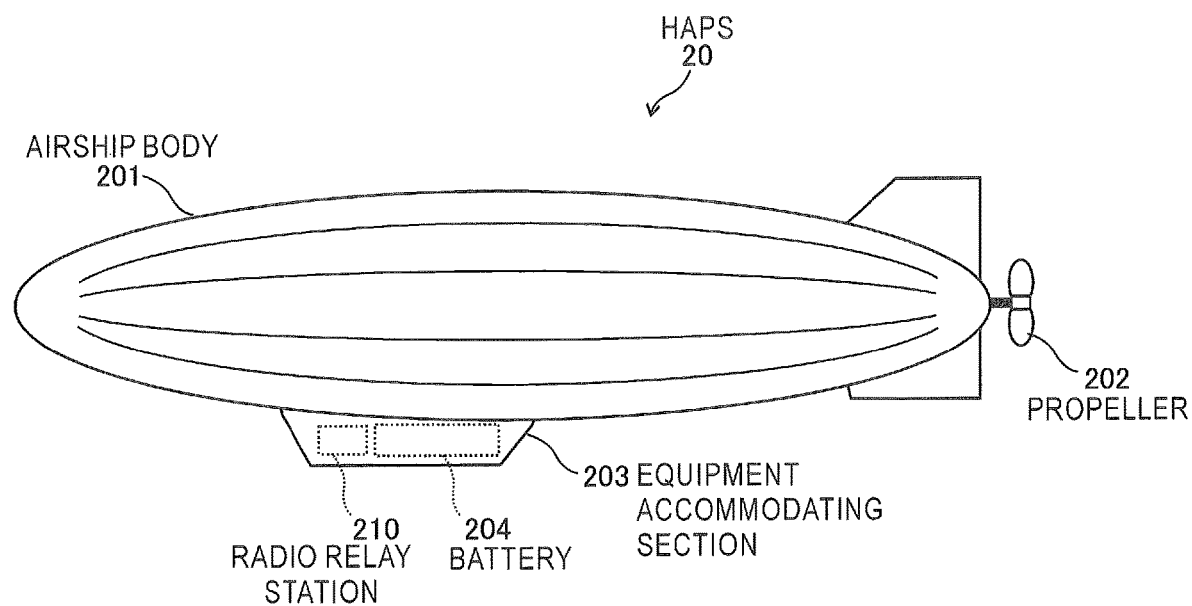
FIG. 5 is a side view showing another example of HAPS used in a communication system in the embodiment.

FIG. 5 is a side view showing another example of the HAPS 20 used in a communication system in the embodiment. The HAPS 20 in FIG. 5 is an unmanned airship-type HAPS, and can mount a large capacity battery since the payload is large. The HAPS 20 has an airship body 201 filled with gas such as helium gas for floating by floating power, a propeller 202 driven by a motor as a propulsion apparatus of a bus-motive power system, and an equipment accommodating section 203 in which mission equipment is accommodated. A radio relay station 210 and a battery 204 are accommodated in the equipment accommodating section 203. A motor of the propeller 202 is rotationally driven by an electric power supplied from the battery 204, and a radio It is noted that, a solar panel having a photovoltaic power generation function may be provided on the top surface of the airship body 201, and an electric power generated by the solar panel is stored in the battery 204.

Figure 6:
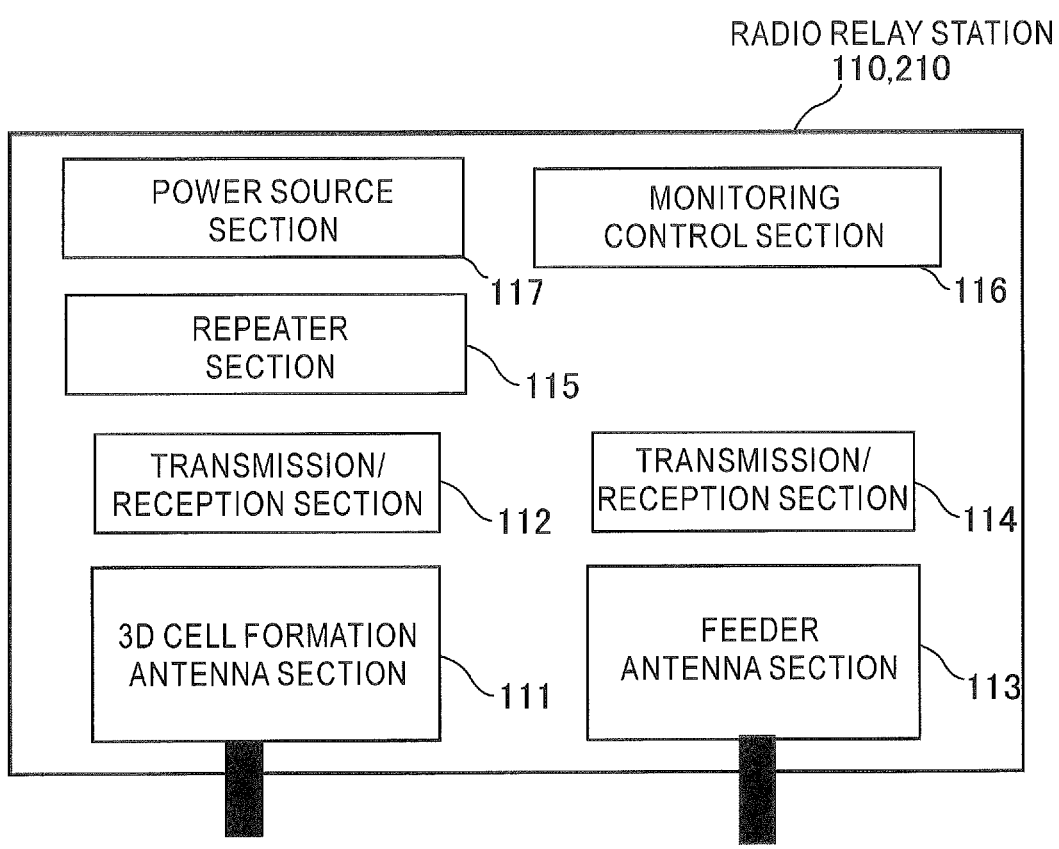
FIG. 6 is a block diagram showing a configuration example of radio relay stations of HAPSs in the embodiment.

FIG. 6 is a block diagram showing a configuration example of the radio relay station 110 and 210 of the HAPS 10 and 20 in the embodiment. The radio relay station 110 and 210 in FIG. 6 are examples of a repeater-type radio relay station. Each of the radio relay stations 110 and 210 includes a 3D cell (three-dimensional cell) formation antenna section 111, a transmission/reception section 112, a feeder antenna section 113, a transmission/reception section 114, a repeater section 115, a monitoring control section 116 and a power source section 117.

The 3D cell-formation antenna section 111 has antennas for forming radial beams 100 and 200 toward the cell-formation target airspace 40, and forms three-dimensional cells 41 and 42 in which a communication with the terminal apparatus can be performed. The transmission/reception section 112 has a transmission/reception duplexer (DUP: DUPlexer) and an amplifier, etc., and transmits radio signals to the terminal apparatuses located in the three-dimensional cells 41 and 42 and receives radio signals from the terminal apparatuses via the 3D cell-formation antenna section 111.

The feeder antenna section 113 has a directional antenna for performing a radio communication with the feeder station 70 on the ground or on the sea. The transmission/reception section 114 has a transmission/reception duplexer (DUP: DUPlexer) and an amplifier, etc., and transmits radio signals to the feeder station 70 and receives radio signals from the feeder station 70 via the 3D cell-formation antenna section 111.

The repeater section 115 relays signals of the transmission/reception section 112 which is transmitted to and received from the terminal apparatus and signals of the transmission/reception section 114 which is transmitted to and received from the feeder station 70. The repeater section 115 may have a frequency conversion function.

The monitoring control section 116 is configured with, for example, a CPU and a memory, etc., and monitors the operation processing status of each section and controls each section in the HAPSs 10 and 20, by executing a preinstalled program. The power source section 117 supplies an electric power outputted from the batteries 106 and 204 to each section in the HAPSs 10 and 20. The power source section 117 may have a function of storing an electric power generated by the solar power generation panel, etc. and an electric power supplied from outside in the batteries 106 and 204.

Figure 7:
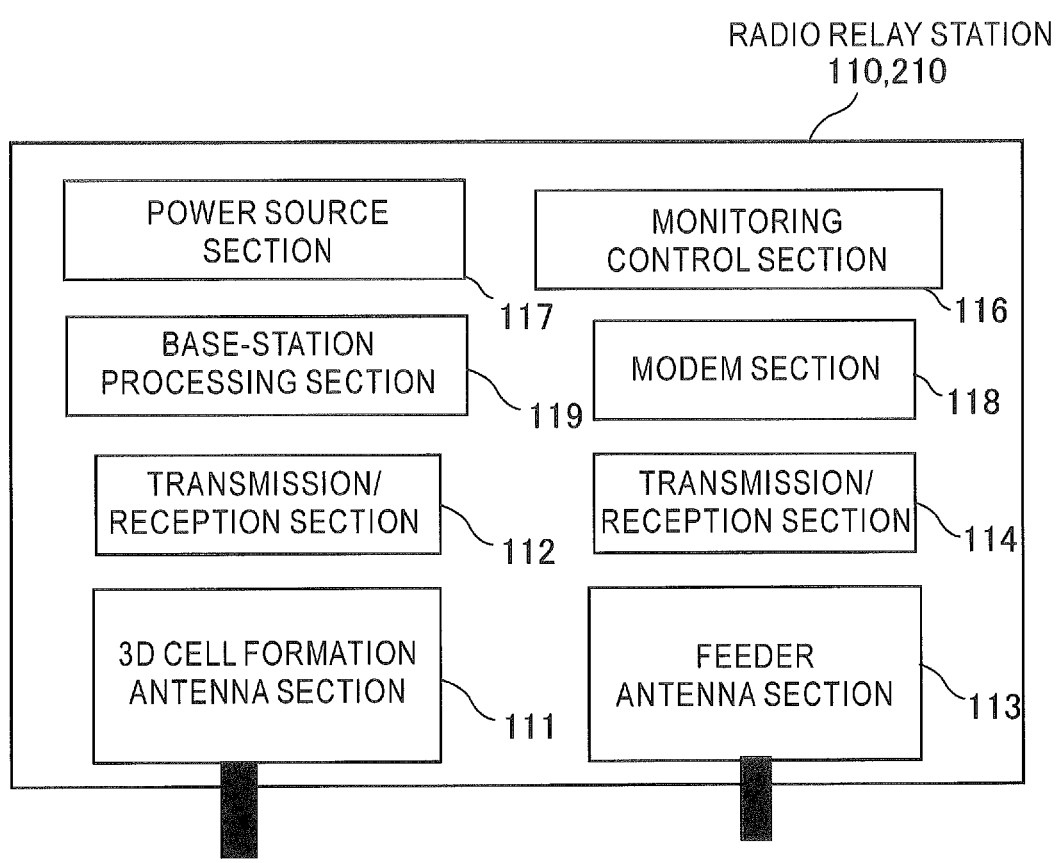
FIG. 7 is a block diagram showing another configuration example of radio relay stations of HAPSs in the embodiment.

FIG. 7 is a block diagram showing another configuration example of the radio relay stations 110 and 210 of the HAPSs 10 and 20 in the embodiment. The radio relay stations 110 and 210 in FIG. 7 are examples of a base-station type radio relay station. It is noted that, in FIG. 7, configuration elements similar to those in FIG. 6 are denoted by the same reference numerals and explanation thereof will be omitted. Each of the radio relay stations 110 and 210 in FIG. 7 further includes a modem section 118 and a base-station processing section 119 instead of the repeater section 115.

The modem section 118, for example, performs a demodulation processing and a decoding processing for a received signal received from the feeder station 70 via the feeder antenna section 113 and the transmission/reception section 114, and generates a data signal to be outputted to the base-station processing section 119. The modem section 118 performs an encoding processing and a modulation processing for the data signal received from the base-station processing section 119, and generates a transmission signal to be transmitted to the feeder station 70 via the feed antenna section 113 and the transmission/reception section 114.

The base-station processing section 119, for example, has a function as an e-Node B that performs a baseband processing based on a method conforming to the standard of LTE/LTE-Advanced. The base-station processing section 119 may process in a method conforming to a future standard of mobile communication such as the fifth generation or the next generation after the fifth generation onwards.

The base-station processing section 119, for example, performs a demodulation processing and a decoding processing for a received signal received from a terminal apparatus located in the three-dimensional cells 41 and 42 via the 3D cell-formation antenna section 111 and the transmission/reception section 112, and generates a data signal to be outputted to the modem section 118. The base-station processing section 119 performs an encoding processing and a modulation processing for the data signal received from the modem section 118, and generates a transmission signal to be transmitted to the terminal apparatus of the three-dimensional cells 41 and 42 via the 3D cell-formation antenna section 111 and the transmission/reception section 112.

Figure 8:
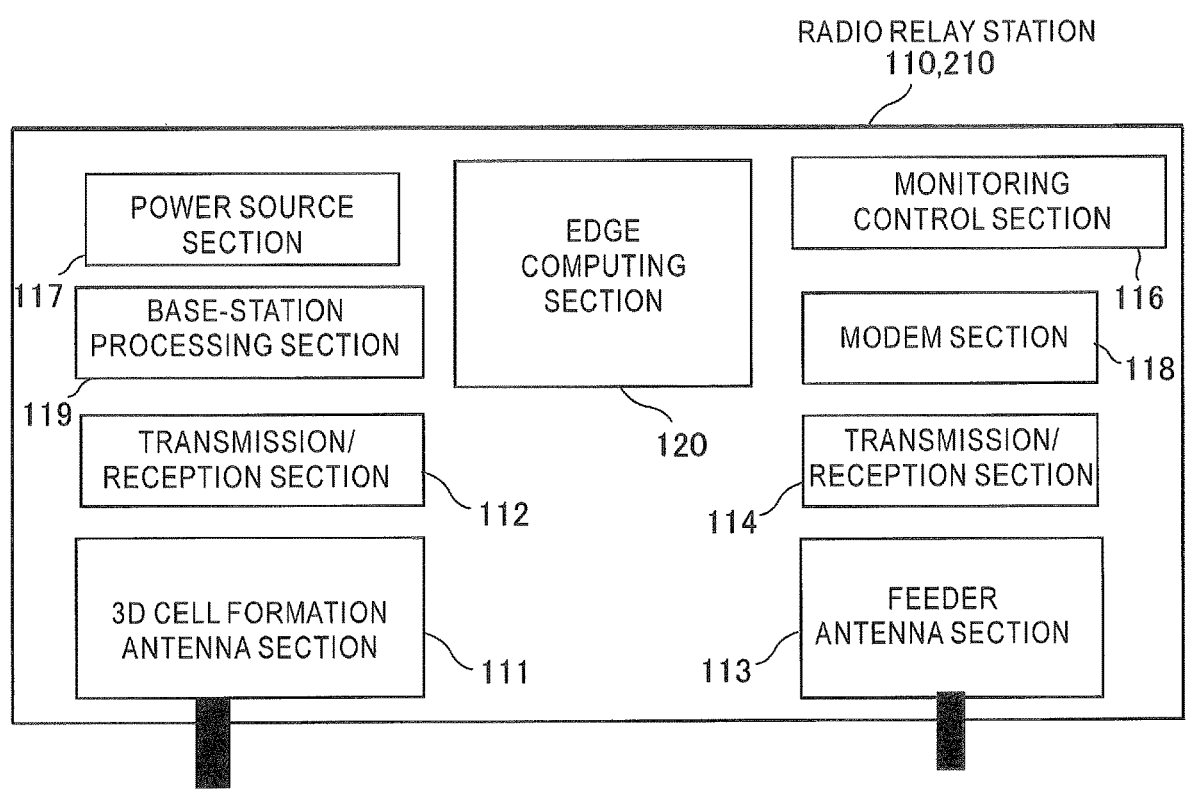
FIG. 8 is a block diagram showing still another configuration example of radio relay stations of HAPSs in the embodiment.

FIG. 8 is a block diagram showing still another configuration example of the radio relay stations 110 and 210 of the HAPSs 10 and 20 in the embodiment. The radio relay stations 110 and 210 in FIG. 8 are examples of a high performance base-station type radio relay station having an edge computing function. It is noted that, in FIG. 8, configuration elements similar to those in FIG. 6 and FIG. 7 are denoted by the same reference numerals and explanation thereof will be omitted. Each of the radio relay stations 110 and 210 in FIG. 8 further includes an edge computing section 120 in addition to the configuration elements in FIG. 7.

The edge computing section 120 is configured with, for example, a compact computer, and can perform various types of information processing relating to a radio relay, etc., in the radio relay stations 110 and 210 of the HAPSs 10 and 20, by executing a preinstalled program.

The edge computing section 120, for example, determines a transmission destination of a data signal based on the data signal received from a terminal apparatus located in the three-dimensional cells 41 and 42, and performs a process of switching a relay destination of communication based on the determination result. More specifically, in case that the transmission destination of the data signal outputted from the base-station processing section 119 is a terminal apparatus located in the own three-dimensional cells 41 and 42, instead of passing the data signal to the modem section 118, the edge computing section 120 returns the data signal to the base-station processing section 119 and transmits the data signal to the terminal apparatus of the transmission destination located in the own three-dimensional cells 41 and 42. On the other hand, in case that the transmission destination of the data signal outputted from the base-station processing section 119 is a terminal apparatus located in another cell other than the own three-dimensional cells 41 and 42, the edge computing section 120 passes the data signal to the modem section 118 and transmits the data signal to the feeder station 70, and transmits the data signal to the terminal apparatus of the transmission destination located in the other cell of the transmission destination via the mobile communication network 80.

The edge computing section 120 may perform a process of analyzing information received from a large number of terminal apparatuses located in the three-dimensional cells 41 and 42. This analysis result may be transmitted to the large number of terminal apparatuses located in the three-dimensional cells 41 and 42, and may be transmitted to a server, etc. of the mobile communication network 80.

Uplink and downlink duplex methods for radio communication with a terminal apparatus via the radio relay stations 110 and 210 are not limited to a specific method, and may be, for example, a time division duplex method (Time Division Duplex: TDD) or a frequency division duplex method (Frequency Division Duplex: FDD). An access method for radio communication with a terminal apparatus via the radio relay stations 110 and 210 is not limited to a specific method, and may be, for example, FDMA (Frequency Division Multiple Access) method, TDMA (Time Division Multiple Access) method, CDMA (Code Division Multiple Access) method or OFDMA (Orthogonal Frequency Division Multiple Access). In the foregoing radio communication, a MIMO (Multi-Input and Multi-Output) technology may be used, which has functions of diversity/coding, transmission beam forming, spatial division multiplexing (SDM: Spatial Division Multiplexing), etc., and in which a transmission capacity per unit frequency can be increased by simultaneously using a plurality of antennas for both of transmission and reception. The MIMO technology may be an SU-MIMO (Single-User MIMO) technology in which one base station transmits a plurality of signals to one terminal apparatus at the same time/same frequency, and may be an MU-MIMO (Multi-User MIMO) technology in which one base station transmits signals to a plurality of different communication terminal apparatuses at the same time/same frequency or a plurality of different base stations transmit signals to one terminal apparatus at the same time/same frequency.

Next, a high-latitude-support HAPS suitable for use in a high latitude area will be explained.

Figure 9:
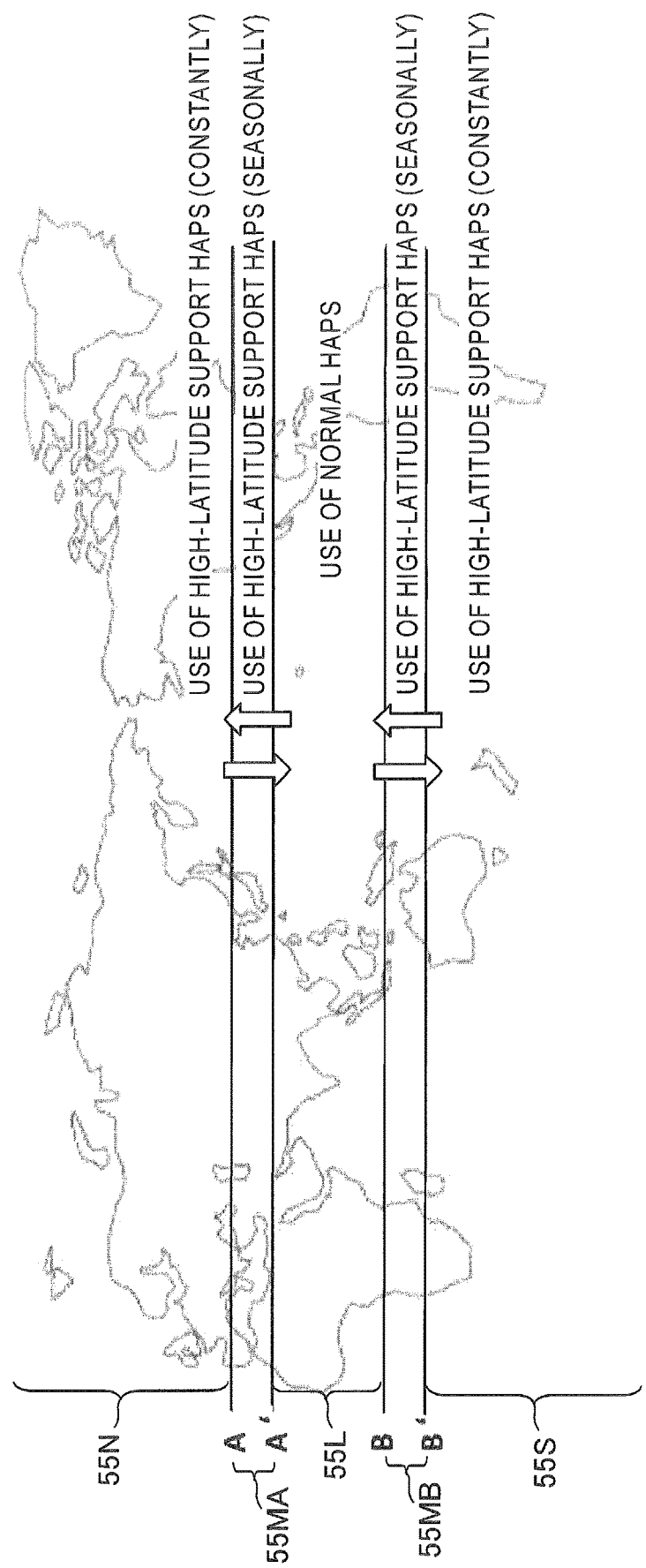
FIG. 9 is an illustration showing an example of selective use of a normal HAPS and a high-latitude-support HAPS in accordance with seasons.

FIG. 9 is an illustration showing an example of selective use of a normal HAPS and a high-latitude-support HAPS in accordance with seasons. In high latitude areas 55N and 55S in FIG. 9, the high-latitude-support HAPS with an enhanced power supply capability may be used because sunshine time is shorter and an air stream is stronger than a low latitude area 55C, and in a low latitude area 55L including an equatorial area, the normal HAPS supporting for low latitude (for example, the HAPS in FIG. 4 described above) may be used.

Since the boundary lines A and B between the high latitude areas 55N and 55S and the low latitude area 55L vary with the season, the HAPS to be used may be switched depending on the season in the intermediate latitude areas 55MA and 55MB (the area between A and A' and the area between B and B') around the Tropic of Cancer and around the Tropic of Capricorn where the boundary lines vary. For example, in case of summer, since the boundary lines move to the positions A and B, a normal HAPS is used in the intermediate latitude area 55MA between A and A', and a high-latitude-support HAPS is used in the intermediate latitude area 55MB between B and B'. On the other hand, in case of winter, since the boundary lines move to the positions A' and B', the high-latitude-support HAPS is used in the intermediate latitude area 55MA between A and A', and the normal HAPS is used in the intermediate latitude area 55MB between B and B'.

Figure 10:
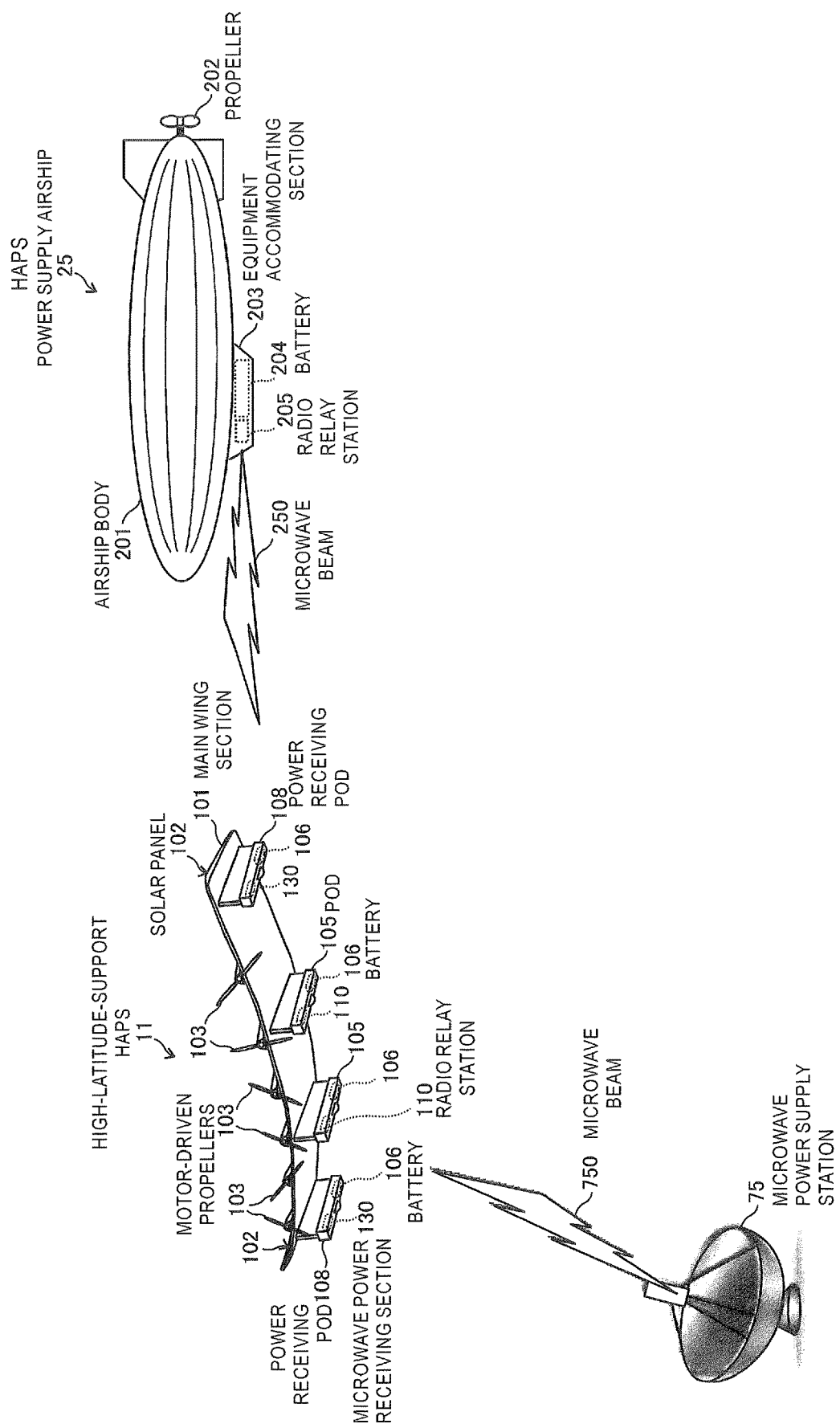
FIG. 10 is an illustration showing an example of state of remote energy-beam power supply to the high-latitude-support HAPS in the embodiment.

FIG. 10 is an illustration showing an example of state of remote energy beam power supply to the high-latitude-support HAPS (solar plane type) 11. In the HAPS 10 in FIG. 10, configuration elements common to those in FIG. 1 are denoted by the same reference numerals, and explanation thereof will be omitted. In FIG. 10, the high-latitude-support HAPS 11 includes power receiving pods 108 at both longitudinal ends of the main wing section 101, respectively. Inside the power receiving pod 108, a microwave power receiving section 130 as a remote energy beam power receiving section and the battery 106 are accommodated. The microwave power receiving section 130 receives a high-power power supply microwave beam 750 or 250 transmitted from a microwave power supply station 75 as a power supply apparatus on the ground or on the sea, or from a power supply airship 25 as a power supply apparatus in the airspace, and converts the received high-power power supply microwave beam 750 or 250 to an electric power and outputs it. The electric power outputted from the microwave power receiving section 130 is stored in the battery 106.

The power supply airship 25, for example, drifts by a air stream, and sequentially transmits the microwave beam for power feeding to the stationary HAPS and supplies an electric power to the HAPS.

Figure 11:
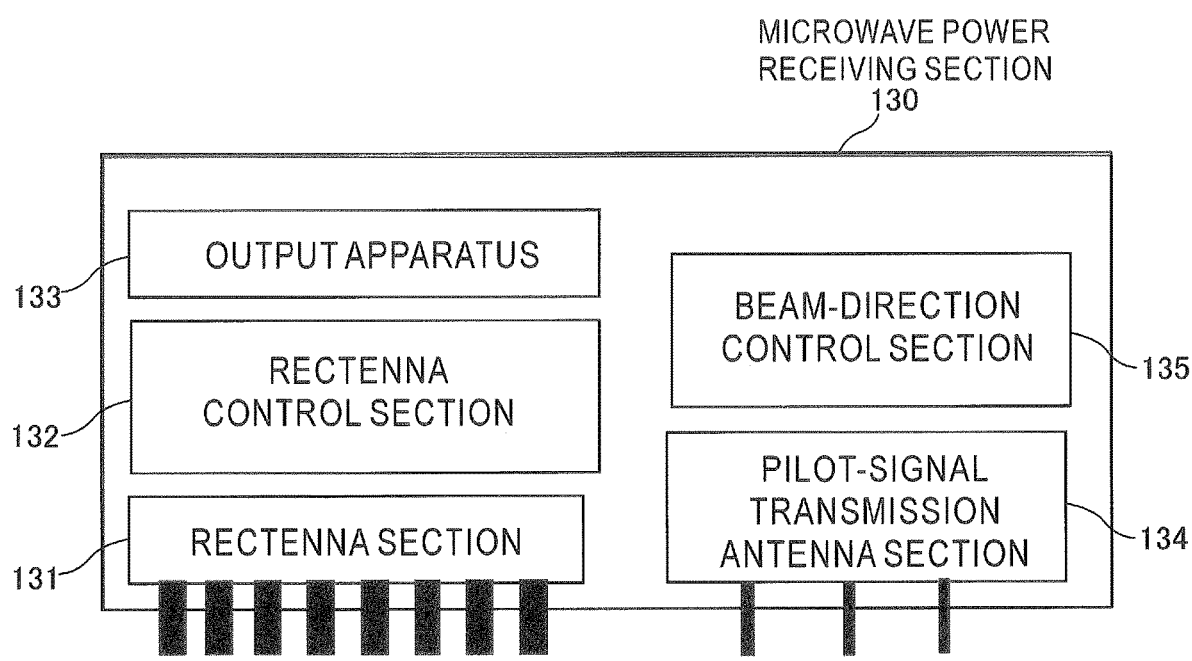
FIG. 11 is a block diagram showing a configuration example of a remote energy-beam power receiving section of the high-latitude-support HAPS in the embodiment.

FIG. 11 is a block diagram showing a configuration example of the microwave power receiving section 130 of the high-latitude-support HAPS 11. In FIG. 11, the microwave power receiving section 130 is provided with a rectenna section 131, a rectenna control section 132, an output apparatus 133, a pilot-signal transmission antenna section 134 and a beam-direction control section 135. The rectenna section 131 receives the high-power power supply microwave beam 750 or 250 transmitted from the microwave power supply station 75 on the ground or on the sea, or from the power supply airship 25, and rectifies the received high-power power supply microwave beam 750 or 250. The rectenna control section 132 controls the power receiving process and the rectification process of the power supply microwave beam by the rectenna section 131. The output apparatus 133 outputs the rectified electric power outputted from the rectenna section 131 to the battery 106. Before receiving the power supply microwave beam 750 or 250, the pilot-signal transmission antenna section 134 transmits a beam of a pilot signal formed with a laser beam or the like for guiding the power supply microwave beam toward the microwave power supply station 75 or the power supply airship 25. The beam-direction control section 135 controls the beam direction of the pilot signal.

It is noted that, in the remote energy beam power supply shown in FIG. 10 and FIG. 11, although the case where the microwave beam is used as the energy beam is described, another energy beam such as a laser beam may be used.

Figure 12:
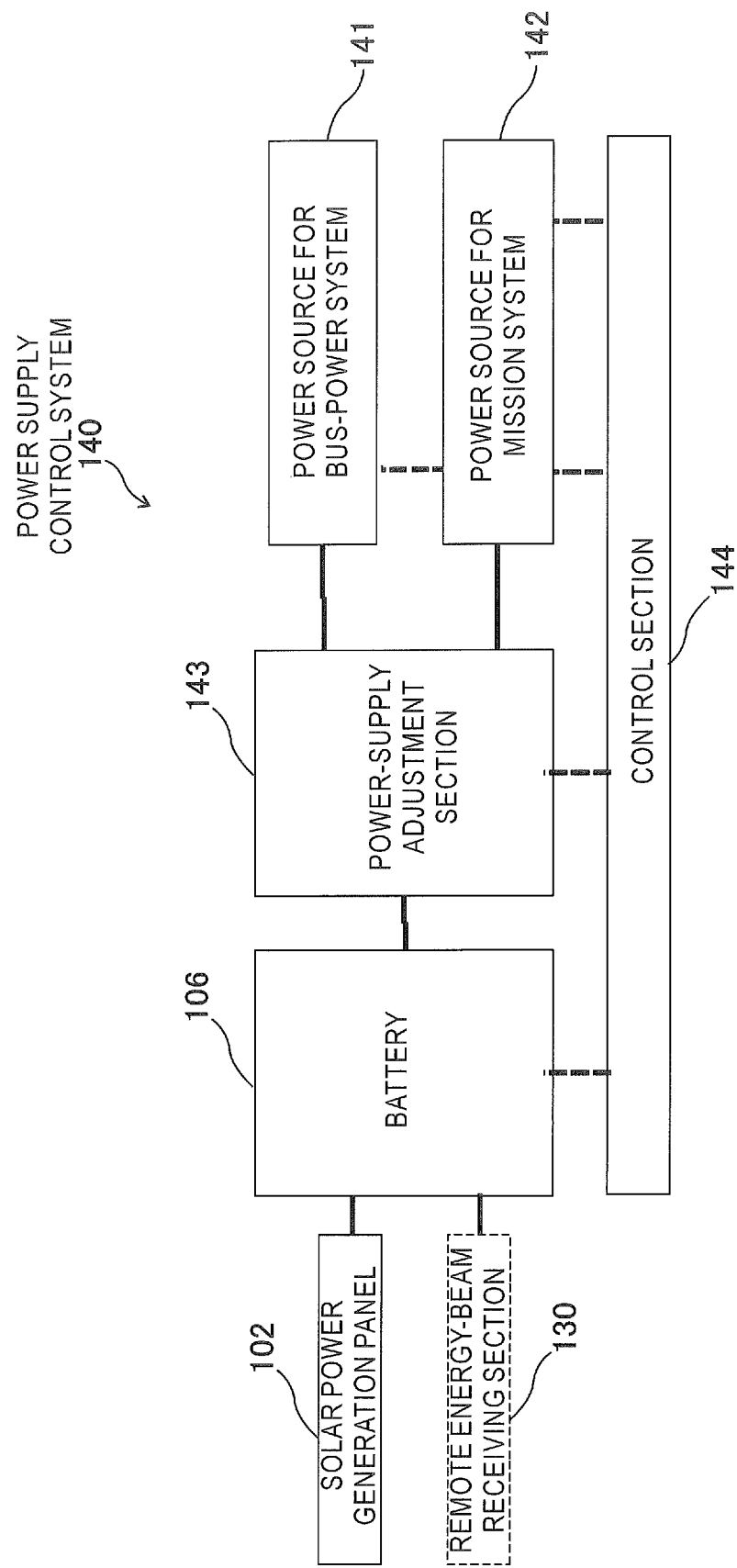
FIG. 12 is a block diagram showing a configuration example of a power supply control system in the high-latitude-support HAPS capable of supporting a solar power supply and a remote energy-beam power supply in the embodiment.

FIG. 12 is a block diagram showing a configuration example of a power supply control system (energy management system) 140 in the high-latitude-support HAPS 11 capable of supporting a solar power supply and a remote energy beam power supply. The power supply control system 140 of the high-latitude-support HAPS 11 is provided with a power source 141 for bus-motive power system, a power source 142 for mission system, a power-supply adjustment apparatus 143 and a control section 144. The power source 141 for bus-motive power system supplies an electric power to the bus-motive power system such as the propeller 103 driven by the motor, and the power source 142 for mission system power supplies an electric power to the communication equipment (mission system) such as the radio relay station 110. The power-supply adjustment apparatus 143 adjusts the power to be supplied to each of the power source 141 for bus-motive power system and the power source 142 for mission system, with respect to the power outputted from the battery 106. The control section 144 controls an output of electric power from the battery 106, an adjustment of electric power supply by the power-supply adjustment apparatus 143, and an output of electric power from each of the power source 141 for bus-motive power system and the power source 142 for mission system.

The control in the power supply control system (energy management system) 140 in FIG. 12 is executed so as to perform an efficient energy management by an algorithm in accordance with situation as follows. For example, in accordance with an instruction from the control section 144, in the power-supply adjustment apparatus 143, the electric power stored in the battery 106 is adjusted and changed a balance between the electric power supplied to the bus-motive power system and the electric power supplied to the mission system in accordance with the situation. When the number of active users (the number of terminal apparatuses) is small in the three-dimensional cell formed by the high-latitude-support HAPS 11, it may be controlled so that the amount of power supply from the mission system to the bus-motive power system is accommodated and the altitude of the high-latitude-support HAPS 11 is gained to accumulate the accommodated power as a potential energy. When the mission system requires an electric power, the amount of power supply to the bus-motive power system may be reduced and a flight mode of the high-latitude-support HAPS 11 may be controlled to shift to a glider mode utilizing the potential energy.

As described above, according to the present embodiment, unlike the conventional base station 90 on the ground, it is possible to form the wide-area three-dimensional cells 41 and 42 in the cell-formation target airspace 40 of the predetermined altitude range (for example, altitude range of 50 [m] or more and 1000 [m] or less) above the ground or the sea level, and to relay a communication between a plurality of terminal apparatuses located in the three-dimensional cells 41 and 42 and the mobile communication network 80. Moreover, since the HAPSs 10 and 20 forming the three-dimensional cells 41 and 42 are located at the altitude lower than that of the artificial satellite (for example, the altitude of the stratosphere), the propagation delay in the radio communication between the terminal apparatuses located in the three-dimensional cells 41 and 42 and the mobile communication network 80 is smaller than that in the case of satellite communication via the artificial satellite. Since the three-dimensional cells 41 and 42 can be formed and the propagation delay of the radio communication is low as described above, it is possible to realize a three-dimensional network of the fifth generation mobile communication with low propagation delay in radio communication.

In particular, according to the present embodiment, by using the high-latitude-support HAPS 11, even in the high latitude area, it is possible to stably realize a three-dimensional network of the fifth generation mobile communication with low propagation delay in radio communication over a long period of time.

It is noted that, the process steps and configuration elements of the radio relay station, the feeder station, the remote control apparatus, the terminal apparatus (user apparatus, mobile station, communication terminal) and the base station apparatus in the base station described in the present description can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, radio relay station, feeder station, base station apparatus, radio relay apparatus, terminal apparatus (user apparatus, mobile station, communication terminal), remote control apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

The invention claimed is:

1. A communication system comprising:
  a radio relay station for relaying a radio communication with a terminal apparatus,
  wherein the radio relay station is provided in each of a plurality of floating objects controlled so as to be located in a floating airspace with an altitude less than or equal to 100 [km] by an autonomous control or an external control,
  wherein the radio relay station forms a three-dimensional cell in a predetermined cell-formation target airspace between a floating object and a ground level or a sea level, when the floating object is located in the floating airspace,
  wherein each of a plurality of radio relay stations forms a beam for performing a radio communication with the terminal apparatus toward the ground level or the sea level,
  wherein the communication system comprises means for controlling at least one of distances between the plurality of floating objects, an altitude of each of the floating objects and an angle of an outer edge of the beam with respect to a virtual vertical line passing through each of the radio relay stations of the floating objects, so that a plurality of beams adjacent to each other in the predetermined cell-formation target airspace partially overlap with each other and the plurality of beams of the radio relay stations cover an overall upper end surface of the predetermined cell-formation target airspace,
  wherein the plurality of floating objects includes a first floating object and a second floating object,
  wherein each beam of the radio relay stations of the first floating object and the second floating objects is formed in a conical shape, and
  wherein when a divergence angle of the beam of the radio relay station of the first floating object is defined as θ1 [rad], a divergence angle of the beam of the radio relay station of the second floating object is defined as θ2 [rad], an altitude of the radio relay station of the first floating object is defined as Hrs1 [m], an altitude of the radio relay station of the second floating object is defined as Hrs2 [m], a horizontal interval between the radio relay station of the first floating object and the radio relay station of the second floating object is defined as Drs [m] and an altitude of the overall upper end surface of the predetermined cell-formation target airspace is defined as Hcu [m], a following expression (3) is satisfied:

$$(Hrs1-Hcu) \times \tan(\theta 1) + (Hrs2-Hcu) \times \tan(\theta 2) \geq Drs \quad (3).$$

2. The communication system according to claim 1, wherein when an altitude of a lower end of the predetermined cell-formation target airspace is defined as Hcl [m], and a maximum reachable distance of a radio signal between each of the radio relay stations of the first floating object and the second floating object and the terminal apparatus is defined as Lmax [m], following expressions (4) and (5) are satisfied:

$$(Hrs1-Hcl)/\cos(\theta 1) \leq L \max \quad (4)$$

$$((Hrs2-Hcl)/\cos(\theta 2) \leq L \max \quad (5).$$

3. The communication system according to claim 1, comprising a radio relay station on a ground or on a sea for forming a beam for a radio communication with the terminal apparatus toward the predetermined cell-formation target airspace.

4. The communication system according to claim 1, comprising a feeder station on a ground or on a sea for performing a radio communication with the radio relay station of the floating object directly or via an artificial satellite.

5. The communication system according to claim 1, comprising a remote control apparatus for remotely controlling at least one of the floating object and the radio relay station,
wherein the remote control apparatus transmits control information for controlling a floating movement of the floating object or a process in the radio relay station, to the floating object, and
wherein the floating object performs a first control to receive the control information from the remote control apparatus and to control the floating movement of the floating object or the process in the radio relay station, or a second control to obtain current position information of the floating object, pre-memorized position control information and position information of another neighboring floating object and to control autonomously the floating movement of the floating object or the process in the radio relay station.

6. The communication system according to claim 1, wherein the communication system performs a control for adjusting at least one of an altitude of the first floating object and a direction and a divergence angle of the beam formed by the radio relay station of the floating object so that an altitude of the three-dimensional cell in the predetermined cell-formation target airspace relative to the ground level is maintained at a predetermined altitude, based on a geographical data of the ground level below the floating object.

7. The communication system according to claim 1, wherein the plurality of floating objects is switched and used based on a power supply capability of a power source for supplying a power to the radio relay station in the floating object and a latitude of the floating airspace in which the floating object is located and used.

8. The communication system according to claim 1, wherein the plurality of floating objects includes a low-latitude-support floating object with a power source for supplying a power to the radio relay station and a high-latitude-support floating object with a power source for supplying a power to the radio relay station by a power supply capability higher than that of the low-latitude-support floating object,
wherein the low-latitude-support floating object and the high-latitude-support floating object are switched and used in accordance with seasons with different sunshine time in an intermediate latitude area,
wherein each of the power source of the low-latitude-support floating object and the power source of the high-latitude-support floating object comprises a photovoltaic power generation section and a battery, and
wherein a power supplied by at least one of the photovoltaic power generation section and the battery of the power source of the high-latitude-support floating object is higher than that of the power source of the low-latitude-support floating object.

9. The communication system according to claim 1, further comprising a power supply apparatus located on the ground or on the sea, the power supply apparatus supplying a power by transmitting an energy beam to the floating object including the radio relay station,
wherein a power source of the floating object comprises a remote energy-beam power receiving section for receiving the energy beam from outside and generating a power.

10. The communication system according to claim 1, further comprising a power-supply floating object controlled to be located in the floating airspace by the autonomous control or the external control, the power-supply floating object supplying a power by transmitting an energy beam to the floating object including the radio relay station,
wherein a power source of the floating object comprises a remote energy-beam power receiving section for receiving the energy beam from outside and generating a power.

11. A remote control apparatus for remotely controlling at least one of the radio relay stations and a floating movement of the floating object in the communication system according to claim 1,
wherein the remote control apparatus transmits control information for controlling the floating movement of the floating object or a process in the radio relay station, to the floating object, and
wherein the remote control apparatus controls at least one of an altitude of the first floating object and a direction and a divergence angle of the beam formed by the radio relay station of the floating object so that the expression (3) is satisfied, based on a geographical data of the ground level below the floating object.

12. The remote control apparatus according to claim 11, wherein the remote control apparatus positionally controls the floating object including the radio relay station so that an altitude of the three-dimensional cell in the predetermined cell-formation target airspace relative to the ground level is maintained at a predetermined altitude, based on an elevation of the ground level located below the floating object.

13. The remote control apparatus according to claim 11, wherein the plurality of floating objects includes a low-latitude-support floating object with a power source for supplying a power to the radio relay station and a high-latitude-support floating object with a power source for supplying a power to the radio relay station by a power supply capability higher than that of the low-latitude-support floating object, and wherein the remote control apparatus controls so as to switch the low-latitude-support floating object and the high-latitude-support floating object in accordance with seasons with different sunshine time in an intermediate latitude area.

14. A floating object comprising:
a radio relay station for relaying a radio communication with a terminal apparatus,
wherein the floating object is controlled so as to be located in a floating airspace with an altitude less than or equal to 100 [km] by an autonomous control or an external control, and
wherein the radio relay station forms a beam for performing the radio communication with the terminal apparatus toward a ground level or a sea level and forms a three-dimensional cell in a predetermined cell-formation target airspace between the floating object and the ground level or the sea level, when the floating object is located in the floating airspace,
wherein the floating object comprises means for controlling at least one of distances between a plurality of floating objects, an altitude of each of the floating objects and an angle of an outer edge of the beam with respect to a virtual vertical line passing through each of a plurality of radio relay stations of the plurality of floating objects, so that a plurality of beams adjacent to each other in the predetermined cell-formation target airspace partially overlap with each other and the plurality of beams of the plurality of radio relay stations cover an overall upper end surface of the predetermined cell-formation target airspace,
wherein the beam is formed in a conical shape, and
wherein when a divergence angle of the beam is defined as $\theta$ [rad], an altitude of the radio relay station of the floating object is defined as $Hrs$ [m], a horizontal interval between the radio relay station of the floating object and another radio relay station of another floating object is defined as $Drs$ [m] and an altitude of the overall upper end surface of the predetermined cell-formation target airspace is defined as $Hcu$ [m], a following expression (6) is satisfied:

$$2 \times (Hrs - Hcu) \times \tan \theta \geq Drs \qquad (6).$$

15. The floating object according to claim 14,
wherein the floating object is positionally controlled so that an altitude of the three-dimensional cell in the predetermined cell-formation target airspace relative to the ground level is maintained at a predetermined altitude, based on an elevation of the ground located below the floating object.

16. The floating object according to claim 14, comprising photovoltaic power generation apparatus for generating an electric power to be supplied to the radio relay station.

17. The floating object according to claim 14,
wherein the floating object is a solar plane comprising a wing with a photovoltaic power generation panel for generating an electric power to be supplied to the radio relay station and a rotatably driven propeller installed on the wing, or an airship comprising a battery for supplying an electric power to the radio relay station.

18. The floating object according to claim 17,
wherein the solar plane comprises a battery, and
wherein the solar plane is flight-controlled to rise up to a high position in a daytime when a power in the battery is surplus and to perform a gliding flight by stopping a power supply to a motor of the propeller from the battery at night when an electric power cannot be generated by the photovoltaic power generation panel.

19. The floating object according to claim 14,
wherein when an altitude of a lower end of the predetermined cell-formation target airspace is defined as $Hcl$ [m], and a maximum reachable distance of a radio signal between the radio relay station of the floating object and the terminal apparatus is defined as $Lmax$ [m], a following expression (7) is satisfied:

$$(Hrs - Hcl)/\cos(\theta) \leq L\max \qquad (7).$$

20. The floating object according to claim 14,
wherein a power source of the floating object comprises:
a battery;
a power source for motive power system for supplying a power to a drive apparatus to float and move the floating object;
a power source for communication system for supplying a power to the radio relay station; and
a power-supply adjustment apparatus for adjusting a power supplied to each of the power source for motive power system and the power source for communication system from the battery, and
wherein the floating object controls so as to reduce an amount of power supply to the power source for motive power system and shift a flight mode of the floating object to a glider mode utilizing a potential energy, when the power source for communication system is required.

21. The floating object according to claim 20,
wherein the power-supply adjustment apparatus adjusts the power supplied to each of the power source for motive power system and the power source for communication system based on a number of terminal apparatuses for which the radio relay station relays radio signals, and
wherein the power-supply adjustment apparatus control so as to accommodate an amount of power supply from the power source for communication system to the power source for motive power system and accumulate the accommodated power as a potential energy by gaining an altitude of the floating object, when the number of terminal apparatuses decreases, the radio signals of the terminal apparatuses being relayed by the radio relay station of the floating object.

22. The floating object according to claim 14,
wherein the floating object performs a control for adjusting at least one of an altitude of the floating object and a direction and a divergence angle of the beam formed by the radio relay station of the floating object based on a geographical data of the ground level below the floating object, so that an altitude of the three-dimensional cell in the predetermined cell-formation target airspace relative to the ground level is constantly maintained.

23. The floating object according to claim 14,
wherein the radio relay station comprises an edge computing section, and
wherein the edge computing section determines a transmission destination of a data signal based on the data signal received from the terminal apparatus located in the three-dimensional cell and performs a process of switching a relay destination of communication based on a determination result.

24. The floating object according to claim 23,
wherein the edge computing section returns the data signal at the edge computing section and transmits the data signal to the terminal apparatus located in the own three-dimensional cell, when the transmission destination of the data signal is the terminal apparatus located in the own three-dimensional cell; and
wherein the edge computing section transmits the data signal to a feeder station and transmits the data signal to a terminal apparatus of the transmission destination located in another cell via a mobile communication network, when the transmission destination of the data signal is the terminal apparatus located in the other cell than the own three-dimensional cell.

25. The floating object according to claim 14,
wherein the radio relay station comprises an edge computing section, and
wherein the edge computing section perform a process of analyzing information received from a plurality of terminal apparatuses located in the three-dimensional cell and transmits a result of the analyzing to the terminal apparatus or a server.

26. The floating object according to claim 14,
wherein a power source of the floating object comprises a remote energy-beam power receiving section for receiving an energy beam from outside and generating an electric power, the energy beam including a microwave beam or a laser beam.

27. A method for using the floating object according to claim 14, the method comprising:
causing the floating object to locate in the floating airspace with the altitude less than or equal to 100 [km] and form the three-dimensional cell in the predetermined cell-formation target airspace between the floating object and the ground level or the sea level by the radio relay station;
causing a low-latitude-support floating object to locate in a floating airspace above a low latitude area, the low-latitude-support floating object including a power source for supplying a power to the radio relay station;
causing a high-latitude-support floating object to locate in a floating airspace above a high latitude area, the high-latitude-support floating object including a power source for supplying a power to the radio relay station by a power supply capability higher than that of the low-latitude-support floating object; and
switching and using the low-latitude-support floating object and the high-latitude-support floating object in accordance with seasons with different sunshine time in an intermediate latitude area.

* * * * *